(12) United States Patent
Konishi et al.

(10) Patent No.: US 11,779,836 B2
(45) Date of Patent: Oct. 10, 2023

(54) VIBRATION CONTROL APPARATUS

(71) Applicant: Sony Interactive Entertainment Inc., Tokyo (JP)

(72) Inventors: Yukari Konishi, Tokyo (JP); Yusuke Nakagawa, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 619 days.

(21) Appl. No.: 16/632,585

(22) PCT Filed: Aug. 24, 2017

(86) PCT No.: PCT/JP2017/030345
§ 371 (c)(1),
(2) Date: Jan. 21, 2020

(87) PCT Pub. No.: WO2019/038888
PCT Pub. Date: Feb. 28, 2019

(65) Prior Publication Data
US 2020/0238168 A1 Jul. 30, 2020

(51) Int. Cl.
*A63F 13/285* (2014.01)
*G06F 3/01* (2006.01)
*G06F 3/16* (2006.01)
*H04S 3/00* (2006.01)
*H04S 7/00* (2006.01)

(52) U.S. Cl.
CPC ............ *A63F 13/285* (2014.09); *G06F 3/016* (2013.01); *G06F 3/165* (2013.01); *H04S 3/008* (2013.01); *H04S 7/30* (2013.01); *A63F 2300/1037* (2013.01); *H04S 2400/01* (2013.01); *H04S 2400/11* (2013.01)

(58) Field of Classification Search
None
See application file for complete search history.

(56) References Cited

U.S. PATENT DOCUMENTS

| | | | |
|---|---|---|---|
| 5,889,670 | A | 3/1999 | Schuler |
| 6,766,299 | B1 | 7/2004 | Bellomo |
| 6,864,877 | B2 | 3/2005 | Braun |
| 7,010,488 | B2 | 3/2006 | van Santen |

(Continued)

FOREIGN PATENT DOCUMENTS

| | | |
|---|---|---|
| CN | 1397061 A | 2/2003 |
| CN | 102576252 A | 7/2012 |

(Continued)

OTHER PUBLICATIONS

International Preliminary Report on Patentability and Written Opinion for related PCT Application No. PCT/JP2017/030344, 13 pages, dated Mar. 5, 2020.

(Continued)

*Primary Examiner* — James K Mooney
(74) *Attorney, Agent, or Firm* — Matthew B. Dernier, Esq.

(57) ABSTRACT

Provided is a vibration control apparatus that acquires content information about content including at least either one of video and audio to be presented to a user, and vibrates a vibration mechanism in such a manner that the user feels a pseudo force sensation defined based on the content information while the content is being presented.

9 Claims, 4 Drawing Sheets

(56) References Cited

U.S. PATENT DOCUMENTS

| | | |
|---|---|---|
| 7,218,310 B2 | 5/2007 | Goldenberg |
| 8,248,218 B2 | 8/2012 | Yamaya |
| 8,249,276 B2 | 8/2012 | Hamada |
| 8,325,144 B1 | 12/2012 | Tierling |
| 8,378,797 B2 | 2/2013 | Pance |
| 8,384,316 B2 | 2/2013 | Houston |
| 8,479,274 B2 | 7/2013 | Furukawa |
| 8,487,759 B2 | 7/2013 | Hill |
| 8,727,878 B2 | 5/2014 | Longdale |
| 8,787,586 B2 | 7/2014 | Hamada |
| 9,070,282 B2 | 6/2015 | Clough |
| 9,098,984 B2 | 8/2015 | Heubel |
| 9,135,791 B2 | 9/2015 | Nakamura |
| 9,436,280 B2 | 9/2016 | Tartz |
| 9,459,632 B2 | 10/2016 | Houston |
| 9,630,098 B2 | 4/2017 | Mikhailov |
| 9,753,537 B2 | 9/2017 | Obana |
| 9,792,501 B1 | 10/2017 | Maheriya |
| 9,846,484 B2 | 12/2017 | Shah |
| 9,946,347 B2 | 4/2018 | Nakagawa |
| 9,952,670 B2 | 4/2018 | Watanabe |
| 9,983,671 B2 | 5/2018 | Adachi |
| 10,109,161 B2 | 10/2018 | Shah |
| 10,150,029 B2 | 12/2018 | Yamano |
| 10,175,761 B2 | 1/2019 | Cruz-Hernandez |
| 10,347,093 B2 | 7/2019 | Rihn |
| 10,394,326 B2 | 8/2019 | Ono |
| 10,444,837 B2 | 10/2019 | Takeda |
| 10,969,867 B2 | 4/2021 | Nakagawa |
| 10,981,053 B2 | 4/2021 | Nakagawa |
| 11,013,990 B2 | 5/2021 | Nakagawa |
| 11,145,172 B2 | 10/2021 | Nakagawa |
| 11,198,059 B2 | 12/2021 | Konishi |
| 11,253,776 B2 | 2/2022 | Enokido |
| 11,260,286 B2 | 3/2022 | Enokido |
| 2002/0030663 A1 | 3/2002 | Goldenberg |
| 2002/0080112 A1 | 6/2002 | Braun |
| 2002/0163498 A1 | 11/2002 | Chang |
| 2003/0030619 A1 | 2/2003 | Martin |
| 2003/0212555 A1 | 11/2003 | van Santen |
| 2004/0220812 A1 | 11/2004 | Bellomo |
| 2005/0134562 A1 | 6/2005 | Grant |
| 2007/0091063 A1 | 4/2007 | Nakamura |
| 2007/0248235 A1 | 10/2007 | Hamada |
| 2007/0253178 A1 | 11/2007 | Uchiumi |
| 2008/0064500 A1 | 3/2008 | Satsukawa |
| 2008/0204266 A1 | 8/2008 | Malmberg |
| 2008/0262658 A1 | 10/2008 | Ding |
| 2009/0017911 A1 | 1/2009 | Miyazaki |
| 2010/0016077 A1 | 1/2010 | Longdale |
| 2010/0056208 A1 | 3/2010 | Ashida |
| 2010/0085462 A1 | 4/2010 | Sako |
| 2010/0090815 A1 | 4/2010 | Yamaya |
| 2010/0101480 A1* | 4/2010 | Sugahara ............ G06F 1/1694 340/407.1 |
| 2010/0245237 A1 | 9/2010 | Nakamura |
| 2011/0012717 A1 | 1/2011 | Pance |
| 2011/0039606 A1 | 2/2011 | Kim |
| 2011/0075835 A1 | 3/2011 | Hill |
| 2011/0163946 A1 | 7/2011 | Tartz |
| 2012/0028710 A1 | 2/2012 | Furukawa |
| 2012/0232780 A1 | 9/2012 | Delson |
| 2012/0281849 A1 | 11/2012 | Hamada |
| 2013/0057509 A1 | 3/2013 | Cruz-Hernandez |
| 2013/0250502 A1 | 9/2013 | Tossavainen |
| 2013/0261811 A1 | 10/2013 | Yagi |
| 2014/0169795 A1 | 6/2014 | Clough |
| 2014/0176415 A1 | 6/2014 | Buuck |
| 2014/0220520 A1 | 8/2014 | Salamini |
| 2014/0266644 A1 | 9/2014 | Heubel |
| 2014/0361956 A1 | 12/2014 | Mikhailov |
| 2014/0378191 A1 | 12/2014 | Hosoi |
| 2015/0042484 A1 | 2/2015 | Bansal |
| 2015/0059086 A1 | 3/2015 | Clough |
| 2015/0070261 A1 | 3/2015 | Saboune |
| 2015/0081110 A1 | 3/2015 | Houston |
| 2015/0273322 A1 | 10/2015 | Nakagawa |
| 2015/0297990 A1 | 10/2015 | Mahlmeister |
| 2015/0302854 A1 | 10/2015 | Clough |
| 2015/0323996 A1* | 11/2015 | Obana ................ A63F 13/2145 345/177 |
| 2015/0356838 A1* | 12/2015 | Obana .................... G06F 3/011 340/407.1 |
| 2016/0012687 A1 | 1/2016 | Obana |
| 2016/0054797 A1 | 2/2016 | Tokubo |
| 2016/0124707 A1 | 5/2016 | Ermilov |
| 2016/0132117 A1 | 5/2016 | Asachi |
| 2016/0144404 A1 | 5/2016 | Houston |
| 2016/0162025 A1 | 6/2016 | Shah |
| 2016/0214007 A1 | 7/2016 | Yamashita |
| 2016/0258758 A1 | 9/2016 | Enokido |
| 2016/0310844 A1 | 10/2016 | Yamashita |
| 2016/0342213 A1 | 11/2016 | Endo |
| 2017/0038841 A1 | 2/2017 | Takeda |
| 2017/0045991 A1 | 2/2017 | Watanabe |
| 2017/0053502 A1 | 2/2017 | Shah |
| 2017/0061784 A1 | 3/2017 | Clough |
| 2017/0087458 A1* | 3/2017 | Nakagawa ............... A63F 13/54 |
| 2017/0092084 A1 | 3/2017 | Rihn |
| 2017/0097681 A1 | 4/2017 | Ono |
| 2017/0136354 A1* | 5/2017 | Yamano ................ G06F 1/1632 |
| 2017/0139479 A1 | 5/2017 | Shimotani |
| 2017/0180863 A1 | 6/2017 | Biggs |
| 2017/0205883 A1 | 7/2017 | Tanaka |
| 2017/0235364 A1 | 8/2017 | Nakamura |
| 2017/0242486 A1 | 8/2017 | Grant |
| 2018/0028911 A1 | 2/2018 | Aoki |
| 2018/0067313 A1 | 3/2018 | Sako |
| 2018/0098583 A1 | 4/2018 | Keller |
| 2018/0203509 A1 | 7/2018 | Yamano |
| 2018/0345131 A1 | 12/2018 | Yamashita |
| 2018/0369865 A1* | 12/2018 | Shoji ...................... G06F 3/016 |
| 2019/0105563 A1 | 4/2019 | Yamano |
| 2019/0278372 A1 | 9/2019 | Nakagawa |
| 2019/0332174 A1 | 10/2019 | Nakagawa |
| 2019/0334426 A1 | 10/2019 | Culbertson |
| 2019/0369730 A1 | 12/2019 | Marchant |
| 2020/0061459 A1 | 2/2020 | Nakagawa |
| 2020/0061460 A1 | 2/2020 | Nakagawa |
| 2020/0070047 A1 | 3/2020 | Nakagawa |
| 2020/0122028 A1 | 4/2020 | Konishi |
| 2020/0225755 A1 | 7/2020 | Lee |
| 2020/0238168 A1 | 7/2020 | Konishi |
| 2020/0238169 A1 | 7/2020 | Konishi |
| 2020/0246692 A1 | 8/2020 | Nakagawa |
| 2020/0282310 A1 | 9/2020 | Nakagawa |
| 2020/0324194 A1 | 10/2020 | Enokido |
| 2020/0324195 A1 | 10/2020 | Enokido |
| 2020/0359687 A1 | 11/2020 | Scatterday |
| 2021/0121776 A1 | 4/2021 | Nakagawa |

FOREIGN PATENT DOCUMENTS

| | | |
|---|---|---|
| CN | 106133650 A | 11/2016 |
| JP | 0884858 A | 4/1996 |
| JP | 11226265 A | 8/1999 |
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005190465 A | 7/2005 |
| JP | 2005332063 A | 12/2005 |
| JP | 3132531 U | 6/2007 |
| JP | 2007324829 A | 12/2007 |
| JP | 2009037582 A | 2/2009 |
| JP | 2009183751 A | 8/2009 |
| JP | 2011501296 A | 1/2011 |
| JP | 2011183374 A | 9/2011 |
| JP | 2012103852 | 5/2012 |
| JP | 2012226482 A | 11/2012 |
| JP | 2013507059 A | 2/2013 |
| JP | 2013052046 A | 3/2013 |
| JP | 2013054645 A | 3/2013 |

(56) References Cited

FOREIGN PATENT DOCUMENTS

| | | | |
|---|---|---|---|
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015118605 A | 6/2015 |
| JP | 2015121983 A | 7/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| JP | 2017063916 A | 4/2017 |
| JP | 2018523863 A | 8/2018 |
| WO | 02073385 A1 | 9/2002 |
| WO | 2008078523 A1 | 7/2008 |
| WO | 2009035100 A1 | 3/2009 |
| WO | 2015059887 A1 | 4/2015 |
| WO | 2015121971 A1 | 8/2015 |
| WO | 2015151380 A1 | 10/2015 |
| WO | 2016038953 A1 | 3/2016 |
| WO | 2016186041 A1 | 11/2016 |
| WO | 2017043610 A1 | 3/2017 |

OTHER PUBLICATIONS

International Preliminary Report on Patentability and Written Opinion for corresponding PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for related PCT Application No. PCT/JP2017/0030909, 11 pages, dated Mar. 12, 2020.
Notice of Reasons for Refusal for corresponding JP Application No. 2019513214, 12 pages, dated Apr. 28, 2020.
Decision to Grant for related JP Application No. JP2019-513523, 5 pages, dated Dec. 24, 2020.
Notification of Reasons for Refusal for related JP Application No. JP2019-537507, 8 pages, dated Dec. 14, 2020.
Notice of Reasons for Refusal for corresponding JP Application No. 2019-537506, 4 pages dated Nov. 18, 2020.
The First Office Action for related CN Application No. 201780093973.6, 16 pages, dated Feb. 22, 2023.
Office Action for related U.S. Appl. No. 16/500,651, 7 pages, dated Apr. 16, 2020.
International Preliminary Report on Patentability and Written Opinion for related PCT Application No. PCT/JP2017/015563, 13 pages, dated Oct. 31, 2019.
International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
Office Action for related U.S. Appl. No. 16/345,071, 10 pages, dated Feb. 19, 2020.
International Search Report for related PCT Application No. PCT/JP2017/044074, 4 pages, dated Jan. 16, 2018.
International Search Report for related PCT Application No. PCT/JP2017/044072, 4 pages, dated Jan. 16, 2018.
International Preliminary Report on Patentability and Written Opinion for related PCT Application No. PCT/JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for related PCT Application No. PCTJP2017044074, 12 pages, dated Jun. 18, 2019.
International Search Report for related PCT Application No. PCT/JP2017/015563, 2 pages, dated Jun. 13, 2017.
International Search Report for related PCT Application No. PCT/JP2017/033925, 4 pages, dated Nov. 7, 2017.
International Search Report for related PCT Application No. PCT/JP2017/015740, 4 pages, dated Jul. 4, 2017.
International Search Report for corresponding PCT Application No. PCT/JP2017/016552, 2 pages, dated Jun. 20, 2017.
International Preliminary Report on Patentability and Written Opinion for related PCT Application No. PCTJP2017044075, 15 pages, dated Jun. 27, 2019.
International Preliminary Report on Patentability and Written Opinion for related PCT Application No. PCT/JP2017/016552, 13 pages, dated Nov. 7, 2019.
International Search Report for related PCT Application No. PCT/JP2017/030344, 4 pages, dated Oct. 10, 2017.
International Search Report for corresponding PCT Application No. PCT/JP2017/030345, 2 pages, dated Sep. 26, 2017.
International Search Report for related PCT Application No. PCT/JP2017/030909, 3 pages, dated Sep. 26, 2017.

* cited by examiner

VIBRATION CONTROL APPARATUS

TECHNICAL FIELD

The present invention relates to a vibration device used for presenting a pseudo force sensation to a user, a vibration control apparatus for controlling the vibration device, a vibration device control method, and a control program.

BACKGROUND ART

In some cases, a device used while it is attached to or retained by the body of a user, such as an operating device connected to a home gaming machine for use, includes a vibration mechanism for vibrating a part or the whole of the device. Such a vibration device is used to present a tactile sensation to the user. The tactile sensation represents a sensation that causes the user to feel as if the user has touched a real object when, for example, the user comes into contact with a virtual object in a virtual space.

SUMMARY

Technical Problems

When a vibration device based on the above-mentioned conventional technology is vibrated according to a particular vibration waveform, the user is given a sensation (hereinafter referred to as the pseudo force sensation) that a pulling force (traction force) is seemingly applied to pull the vibration device in a particular direction. When the user is viewing certain content, an enhanced realistic sensation can be given to the user by presenting a pseudo force sensation matching the viewed content. However, whatever the content may be, the pseudo force sensation to be presented to match the content is not always prepared. Further, in some cases, it is difficult for a content supplier to predefine the pseudo force sensation to be presented.

The present invention has been made in view of the above circumstances. An object of the present invention is to provide a vibration control apparatus, a vibration device, a vibration device control method, and a control program that are capable of presenting to a user a pseudo force sensation matching the content to be viewed.

Solution to Problems

A vibration control apparatus according to the present invention is a vibration control apparatus for vibrating a vibration mechanism, and includes a content information acquisition section and a vibration control section. The content information acquisition section acquires content information about content including at least either one of video and audio to be presented to a user. The vibration control section vibrates the vibration mechanism in such a manner that the user feels a pseudo force sensation defined based on the content information while the content is being presented.

A vibration device according to the present invention includes a vibration mechanism, a reception section, and a control section. The reception section receives a control command that specifies generation of a vibration causing a user to feel a pseudo force sensation defined based on content information about content while the content is being presented. The content includes at least either one of video and audio to be presented to the user. The control section causes the vibration mechanism to generate a vibration based on the control command.

A method of controlling a vibration mechanism according to the present invention includes the steps of: acquiring content information about content including at least either one of video and audio to be presented to a user; and vibrating the vibration mechanism in such a manner that the user feels a pseudo force sensation defined based on the content information while the content is being presented.

A program according to the present invention is a program for controlling a vibration mechanism. The program causes a computer to function as a content information acquisition section and a vibration control section. The content information acquisition section acquires content information about content including at least either one of video and audio to be presented to a user. The vibration control section vibrates the vibration mechanism in such a manner that the user feels a pseudo force sensation defined based on the content information while the content is being presented. The program may be supplied on a computer-readable, non-transitory information storage medium.

DESCRIPTION OF EMBODIMENT

An embodiment of the present invention will now be described with reference to the accompanying drawings.

A vibration control system 1 according to an exemplary embodiment of the present invention includes a vibration control apparatus 10 and a vibration device 20. The vibration device 20 is connected to the vibration control apparatus 10.

The vibration device 20 is used while it is held by a hand of a user or attached to the body of the user. The vibration device 20 has a built-in vibration mechanism 21. The vibration mechanism 21 is operated to present a vibration to the user. The vibration mechanism 21 may be a linear resonance actuator, a voice coil motor, an eccentric motor, or other vibration generation element. The vibration device 20 may include various operating members to be operated by the user, such as an operating button and a lever. Here, it is assumed as a concrete example that the vibration device 20 includes only one vibration mechanism 21 for generating a vibration along one axis and is able to present a pseudo force sensation along such a vibration direction.

Figure 1:
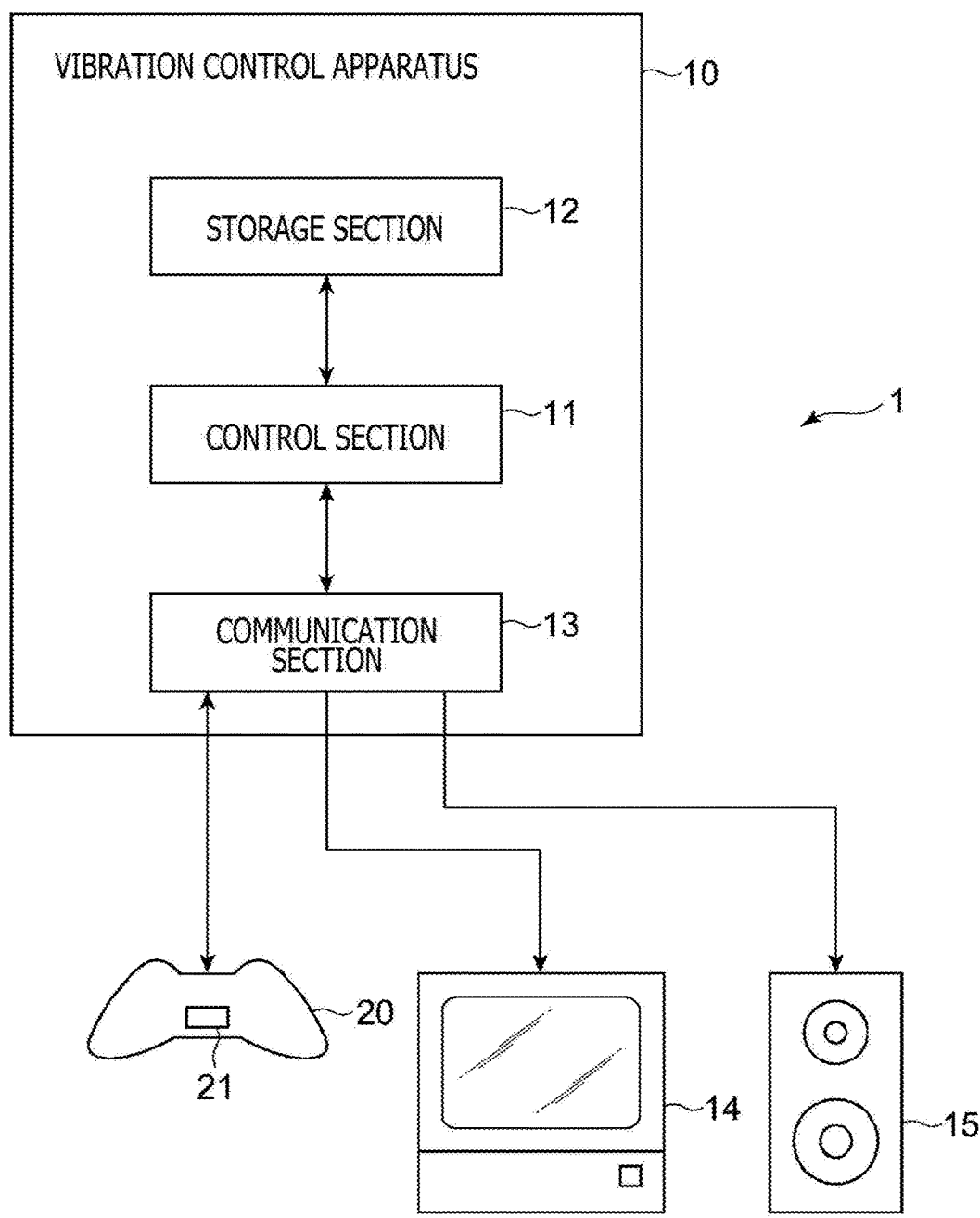
FIG. 1 is a block diagram illustrating an exemplary configuration of a vibration control system including a vibration control apparatus according to an embodiment of the present invention.

The vibration control apparatus 10 is an information processing apparatus communicatively connected to the vibration device 20. Thus, the vibration control apparatus 10 may be, for example, a home gaming machine or a personal computer. In the present embodiment, the vibration control apparatus 10 is further communicatively connected to a display apparatus 14 and an audio reproduction apparatus 15. As illustrated in FIG. 1, the vibration control apparatus 10 includes a control section 11, a storage section 12, and a communication section 13.

The control section 11 includes a program control device such as a central processing unit (CPU), and performs various information processes in accordance with a program stored in the storage section 12. Concrete examples of processes performed by the control section 11 will be described in detail later.

The storage section 12 is, for example, a memory device, and stores the program to be executed by the control section 11. The program may be stored on a computer-readable, non-transitory storage medium, supplied, and copied into the storage section 12. The storage section 12 further functions as a work memory for the control section 11.

The communication section 13 includes a universal serial bus (USB) or other serial interface or a Bluetooth (registered trademark) or other wireless communication interface. The vibration control apparatus 10 is communicatively connected to the vibration device 20 through the communication section 13. In the present embodiment, particularly, the communication section 13 transmits a control signal for operating the vibration mechanism 21 to the vibration device 20 in accordance with an instruction from the control section 11. Further, the communication section 13 includes communication interfaces for wiredly or wirelessly communicating with the display apparatus 14 and the audio reproduction apparatus 15, respectively. The vibration control apparatus 10 transmits video data, which is to be displayed on the display apparatus 14, to the display apparatus 14 through the communication section 13. Further, the vibration control apparatus 10 transmits an audio signal, which is to be reproduced by the audio reproduction apparatus 15, to the audio reproduction apparatus 15.

The display apparatus 14 displays video based on a video signal transmitted from the vibration control apparatus 10. The display apparatus 14 may be, for example, a head-mounted display or other similar device worn on the head of the user. The audio reproduction apparatus 15 reproduces audio based on the audio signal transmitted from the vibration control apparatus 10. The audio reproduction apparatus 15 may include a plurality of speakers installed at a distance from each other or may be a set of headphones worn on the ears of a user.

Figure 2:
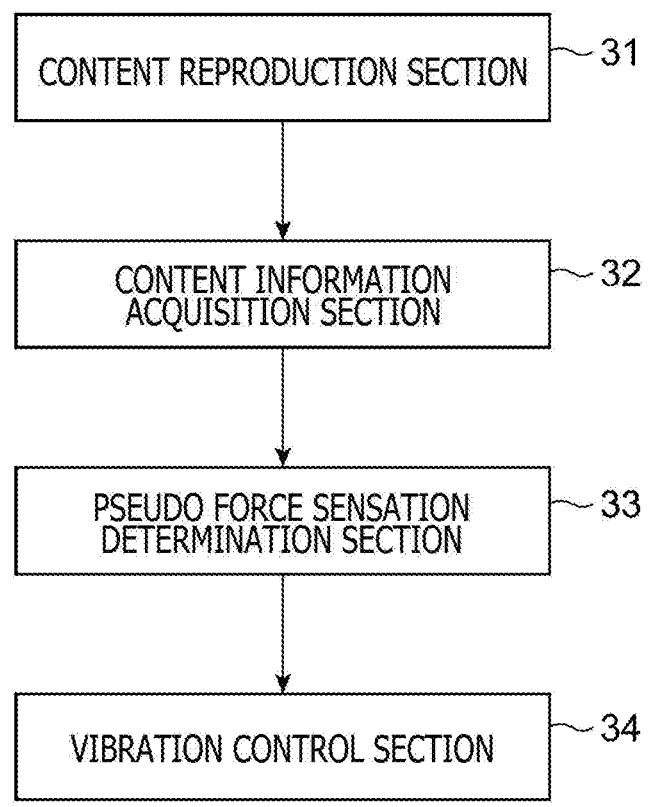
FIG. 2 is a functional block diagram illustrating the functions of the vibration control apparatus according to an embodiment of the present invention.

Operations of the control section 11 in the vibration control apparatus 10 will now be described. As illustrated in FIG. 2, the control section 11 in the present embodiment functionally includes a content reproduction section 31, a content information acquisition section 32, a pseudo force sensation determination section 33, and a vibration control section 34. The functions of these sections are implemented when the control section 11 operates in accordance with the program stored in the storage section 12. The program may be supplied to the vibration control apparatus 10 through the Internet or other communication network, or stored on an optical disk or other computer-readable information storage medium and supplied to the vibration control apparatus 10.

The content reproduction section 31 is implemented when the control section 11 executes an application program such as a content player. The application program for implementing the content reproduction section 31 may be, for example, a game for reproducing content that varies based on a user input. The content reproduction section 31 reproduces content C that includes at least either one of video and audio. More specifically, in a case where the content C includes video, the content reproduction section 31 draws the video and outputs it as a video signal. The video is then displayed on the display apparatus 14 and viewed by the user. In a case where the content C includes audio, the content reproduction section 31 outputs the audio as an audio signal. The outputted audio signal is reproduced by the audio reproduction apparatus 15.

The content information acquisition section 32 acquires information about the content C to be reproduced by the content reproduction section 31 (this information is hereinafter referred to as the content information). More specifically, the content information acquisition section 32 may read the content information outputted from the content reproduction section 31, or may analyze the video and audio included in the content C reproduced by the content reproduction section 31 and acquire the result of analysis as the content information. Concrete examples of the content information acquired by the content information acquisition section 32 will be described later.

The pseudo force sensation determination section 33 defines, based on the content information acquired by the content information acquisition section 32, the pseudo force sensation to be presented to the user. More specifically, the pseudo force sensation determination section 33 determines the time point, direction, and strength of pseudo force sensation presentation during the reproduction of the content C by the content reproduction section 31. Concrete examples of the pseudo force sensation defined by the pseudo force sensation determination section 33 will be described later.

In order to present to the user the pseudo force sensation defined by the pseudo force sensation determination section 33, the vibration control section 34 defines the vibration to be generated by the vibration device 20 (this vibration is hereinafter referred to as the pseudo force sensory vibration), and outputs a control command for generating the defined vibration to the vibration device 20. When generating the pseudo force sensation defined by the pseudo force sensation determination section 33, the vibration control section 34 may display relevant information on the screen of the display apparatus 14 in order to indicate that pseudo force sensation generation is in progress.

Figure 3:
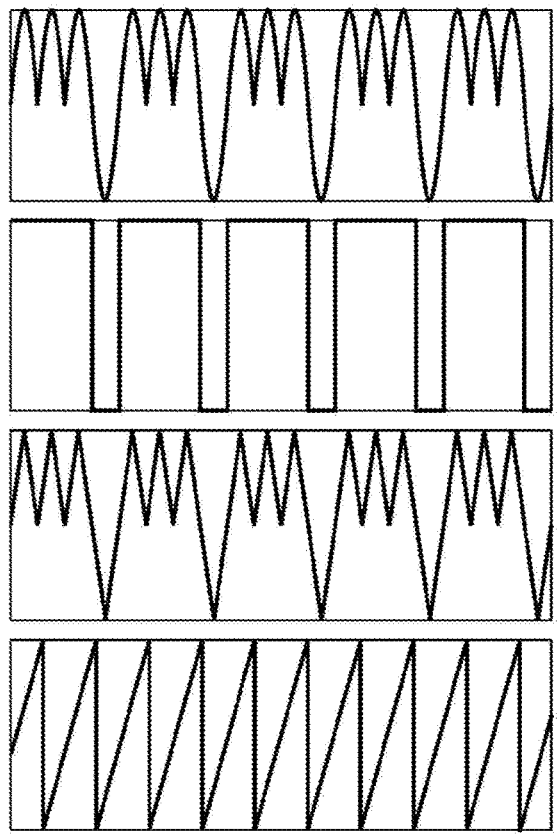
FIG. 3 is a diagram illustrating concrete examples of a waveform for generating a pseudo force sensation.

FIG. 3 illustrates concrete examples of a waveform of pseudo force sensory vibration (this waveform is hereinafter referred to as the pseudo force sensory waveform). As illustrated in FIG. 3, the pseudo force sensory vibration is a vibration that is generated by repeating, at predetermined intervals, a waveform having a specific pattern (this waveform is hereinafter referred to as the basic waveform) formed, for example, of a sine wave, a triangular wave, a sawtooth wave, or a rectangular wave. Generating the above-described vibration causes the user to feel the pseudo force sensation in the direction of the vibration. The vibration control section 34 generates the pseudo force sensory waveform by using prepared data on the basic waveform and information about pseudo force sensation specified by the pseudo force sensation determination section 33, and transmits a control command including data on the generated pseudo force sensory waveform to the vibration device 20.

Upon receiving the above control command, the vibration device 20 causes the vibration mechanism 21 to generate a vibration based on the pseudo force sensory waveform. As a result, the pseudo force sensation based on the definition made by the pseudo force sensation determination section 33 is presented to the user. The functions of the above-described sections enable the vibration control apparatus 10 to present, to the user, the pseudo force sensation based on the content even when the pseudo force sensation to be presented is not predefined for the content C.

The following description deals with concrete examples of content information acquired by the content information acquisition section 32 and of pseudo force sensation defined by the pseudo force sensation determination section 33 in accordance with the acquired content information.

As a first example, an example of control based on audio will now be described. This example assumes that a plurality of channels of audio are included in the content C. The content information acquisition section 32 references the audio signal outputted from the content reproduction section 31, and acquires information indicative of the volumes of the channels as the content information.

The pseudo force sensation determination section 33 defines the pseudo force sensation in accordance with the volumes of the channels. More specifically, the pseudo force sensation determination section 33 selects, for example, one of left and right two audio channels so as to present, to the user, a pseudo force sensation oriented in a direction toward a higher volume. The magnitude of the pseudo force sensation may be varied in accordance with the volume in the direction of pseudo force sensation presentation or with the difference between left and right volumes. When control is exercised in the above-described manner in a case where the user is listening to audio whose left and right volumes differ from each other by using, for example, headphones, the user can be made to feel like being pulled in a direction toward a louder sound.

Figure 4:
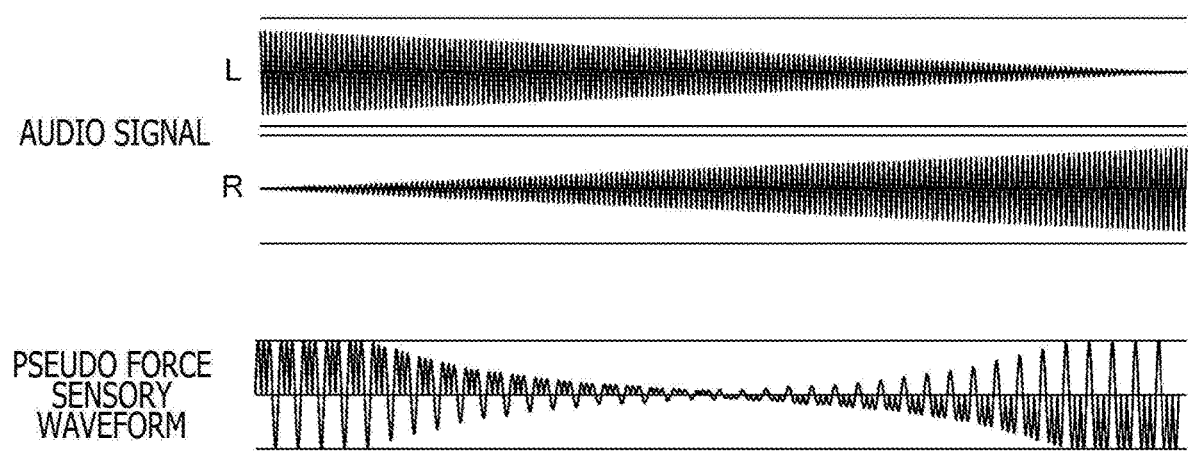
FIG. 4 is a diagram illustrating an exemplary pseudo force sensation based on audio included in content.

FIG. 4 illustrates a concrete example of control exercised based on the above-described audio signal. The two upper waveforms represent L (left) and R (right) channel audio signals, respectively. The lowest waveform represents a generated pseudo force sensory waveform. Here, it is assumed that the upward direction of the pseudo force sensory waveform coincides with the leftward direction as viewed from the user. In the example of FIG. 4, L-channel audio is initially reproduced at a high volume, and then gradually reproduced at lower volumes. In contrast, the volume of R-channel audio is initially low, and is then gradually increased over time. This causes the user to feel as if a sound generation source is moving from left to right. Accordingly, the pseudo force sensory waveform initially presents a pseudo force sensation oriented in the leftward direction, then its force gradually attenuates, and from the middle of the pseudo force sensation presentation, the pseudo force sensory waveform conversely presents a gradually increasing pseudo force sensation oriented in the rightward direction.

Further, in a certain case, the content reproduction section 31 reproduces the position and direction of a sound generation source (sound source) by using a stereophonic technology. In that case, the content information acquisition section 32 may analyze, for example, the volume difference and time lag between left and right channels and changes in phase and frequency response, identify the direction of sound generation (the direction of the sound source) relative to a listener, and acquire the identified direction as the content information. Even in a case where the content reproduction section 31 reproduces audio of three or more channels, the content information acquisition section 32 is able to identify the direction of the sound source by analyzing audio information about each channel. Based on information about the direction of the sound source, which is acquired by the content information acquisition section 32, the pseudo force sensation determination section 33 may present to the user a pseudo force sensation oriented toward that direction. Alternatively, the pseudo force sensation determination section 33 may identify temporal changes in the position of the sound source (i.e., the direction of movement) and present to the user a pseudo force sensation oriented toward the direction of movement. Further, in contrary to the foregoing description, the pseudo force sensation determination section 33 may present to the user a pseudo force sensation oriented away from a direction toward a louder sound.

Moreover, even in a case where only one channel of audio is included in the content C, the pseudo force sensation determination section 33 may present the pseudo force sensation based on the audio. In that case, the direction of pseudo force sensation presentation may be a predetermined direction, a gravity direction at the time, or a direction close to the gravity direction. The direction close to the gravity direction may be used for pseudo force sensation presentation because that direction causes the user to strongly feel the pseudo force sensation. In this case, it is assumed that the vibration device 20 includes an acceleration sensor or other section for detecting the gravity direction, and the pseudo force sensation determination section 33 uses the result of such detection to determine the direction of pseudo force sensation presentation.

In a case where the predetermined conditions are satisfied, for example, by the volume and frequency of audio included in the content C, the pseudo force sensation determination section 33 may present the pseudo force sensation. For example, in a case where audio having a frequency within a predetermined numerical value range is to be reproduced, the pseudo force sensation determination section 33 may present the pseudo force sensation. In this case, it is assumed that the content information includes information about not only the volume of the audio but also the frequency of the audio.

As a second example, an example of control based on changes in video will now be described. The following description assumes that, as a concrete example, a target object O appearing in the video is predefined. In a case where video drawing the inside of a virtual space in real time is to be reproduced as the content C by the content reproduction section 31, the target object O may be a predetermined object disposed in the virtual space. In this case, the content information may be information about a position within the video depicting the target object O, which is identified when the content reproduction section 31 draws the video.

Further, even in a case where the content reproduction section 31 reproduces pre-rendered video, the content information acquisition section 32 may analyze the video in real time, determine whether or not a predetermined target object O is depicted in the video, and acquire the position of the target object O in the video as the content information. The movement of such an object depicted in video can be identified by using, for example, a publicly known optical flow technology.

The pseudo force sensation determination section 33 determines the direction of pseudo force sensation in accordance with the position within video depicting the target object O. It is assumed, for example, that the pseudo force sensation determination section 33 presents to the user a pseudo force sensation oriented in the leftward direction at a time point when the target object O is depicted on the left side in the video, and presents to the user a pseudo force sensation oriented in the rightward direction at a time point when the target object O is depicted on the right side in the video.

Figure 5:
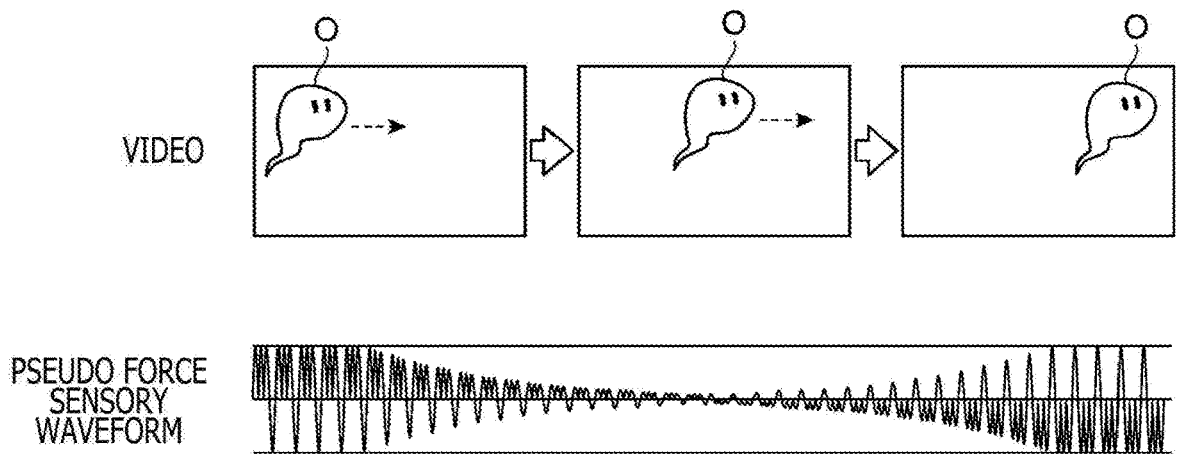
FIG. 5 is a diagram illustrating an exemplary pseudo force sensation based on video included in content.

FIG. 5 illustrates a concrete example of control exercised based on the above-described position of the target object O. The upper part of FIG. 5 depicts temporal changes in the position of the target object O within video. The lower part of FIG. 5 depicts a pseudo force sensory waveform that is generated in conjunction with the video depicted in the upper part. In this example, the target object O moves with time from the left side of the screen to the right side. Accordingly, it is assumed that the pseudo force sensation determination section 33 initially presents a pseudo force sensation oriented in the leftward direction, then gradually attenuates the presented pseudo force sensation, and when the target object O moves rightward beyond the center of the screen, presents a pseudo force sensation oriented in the rightward direction. This example assumes that the presented pseudo force sensation becomes stronger with an increase in the distance from the center of the screen to the target object O.

The above description assumes that the pseudo force sensation determination section 33 defines the pseudo force sensation to be presented at each time point in accordance with the absolute position of the target object O at that time point. Alternatively, however, the pseudo force sensation determination section 33 may determine the direction of the pseudo force sensation in accordance with the direction of movement of the target object O within the video. More specifically, in a case where the target object O is moving in the rightward direction as depicted, for example, in FIG. 5, the pseudo force sensation determination section 33 may correspondingly present to the user a pseudo force sensation oriented in the rightward direction. In this case, in contrast to the example depicted in the lower part of FIG. 5, the pseudo force sensation determination section 33 consistently continues to present to the user a pseudo force sensation oriented in the rightward direction without regard to the current position of the target object O within the video while the target object O is moving in the rightward direction within the video. Further, in this example, the strength of the pseudo force sensation to be presented may be changed in accordance, for example, with the movement speed of the target object O. When, for example, the strength of the presented pseudo force sensation is increased with an increase in the movement speed of the target object O, the user can be made to feel as if the user is pulled by the target object O.

Here, it is assumed that the direction of pseudo force sensation is determined in accordance with the direction of movement of the target object O. Alternatively, however, the pseudo force sensation determination section 33 may determine the direction of pseudo force sensation in accordance with the movement of a background in the video. For example, in a case where the background in the video is moving in the rightward direction, the point of view is moving in the leftward direction. In such a case, the pseudo force sensation determination section 33 may present to the user a pseudo force sensation oriented in the leftward direction.

In the concrete examples of processing performed by the pseudo force sensation determination section 33, which have been described above, the direction of pseudo force sensation direction that is temporarily determined by the pseudo force sensation determination section 33 in accordance with the content information may differ in some cases from the direction of pseudo force sensation that can be presented by the vibration mechanism 21. For example, in a case where the vibration mechanism 21 is able to generate a vibration only in the left-right direction as viewed from the user holding the vibration device 20, the vibration device 20 is allowed to present only a pseudo force sensation oriented in the left-right direction. If, in the above case, the target object O moves in the up-down direction within the screen in a situation where the direction of pseudo force sensation is determined based, for example, on the direction of movement of the target object O, the pseudo force sensation based on the direction of movement cannot be presented.

In the above case, the pseudo force sensation determination section 33 may alternatively present a pseudo force sensation that is oriented in a direction relatively close to a target direction. An alternative is to generate a vibration other than a pseudo force sensory vibration or generate a vibration other than the pseudo force sensory vibration while presenting a pseudo force sensation in a presentable direction.

Further, in a case where the vibration device 20 includes a plurality of built-in vibration mechanisms 21, the pseudo force sensation determination section 33 may cause the vibration mechanism 21 disposed toward a direction of intended pseudo force sensation presentation to generate the pseudo force sensory vibration or generate a normal vibration instead of the pseudo force sensation. As a concrete example, when a pseudo force sensation oriented in the rightward direction is to be presented correspondingly to the rightward movement of the target object O in a case where two vibration mechanisms 21 disposed on the left and right of the vibration device 20 are able to generate a vibration only in the up-down direction, the pseudo force sensation determination section 33 makes a determination so as to present a downward pseudo force sensation by using one of the two vibration mechanisms 21 that is disposed toward the rightward direction as viewed from the user. Conversely, when a leftward pseudo force sensation is to be presented, the pseudo force sensation determination section 33 makes a determination so as to present the downward pseudo force sensation by using the vibration mechanism 21 that is disposed toward the leftward direction. The reason why a downward pseudo force sensation is presented instead of an upward pseudo force sensation is that a pseudo force sensation oriented in a direction closer to the gravity direction can easily be presented to the user as mentioned earlier.

Moreover, as another example, in a case where a pseudo force sensation oriented in the upper right direction is to be presented correspondingly to the upper right movement of the target object O, the pseudo force sensation determination section 33 may make the vibration generated from the rightward vibration mechanism 21 stronger than the vibration generated from the leftward vibration mechanism 21 by causing the two vibration mechanisms 21 to present an upward pseudo force sensation and causing the rightward vibration mechanism 21 to superimpose the waveform of a vibration other than the pseudo force sensory vibration on the waveform of the upward pseudo force sensation. Using the above-described method makes it possible to artificially present a pseudo force sensation based on the movement of the target object O.

The foregoing description assumes that the vibration mechanism 21 is disposed at a fixed position in the housing of the vibration device 20 and is thus able to present a pseudo force sensation oriented in a limited direction. However, the vibration device 20 according to the embodiment of the present invention is not limited to the above-described one. The vibration device 20 may alternatively include a drive mechanism 22 that varies the orientation of the vibration mechanism 21 in the housing in order to present the pseudo force sensation over a wider range. When the vibration mechanism 21 includes such a drive mechanism 22, the pseudo force sensation determination section 33 makes it possible to present the pseudo force sensation in various directions determined based on the content information by causing the drive mechanism 22 to vary the orientation of the vibration mechanism 21 and controlling the vibration mechanism 21 to generate a pseudo force sensory vibration.

Figure 6:
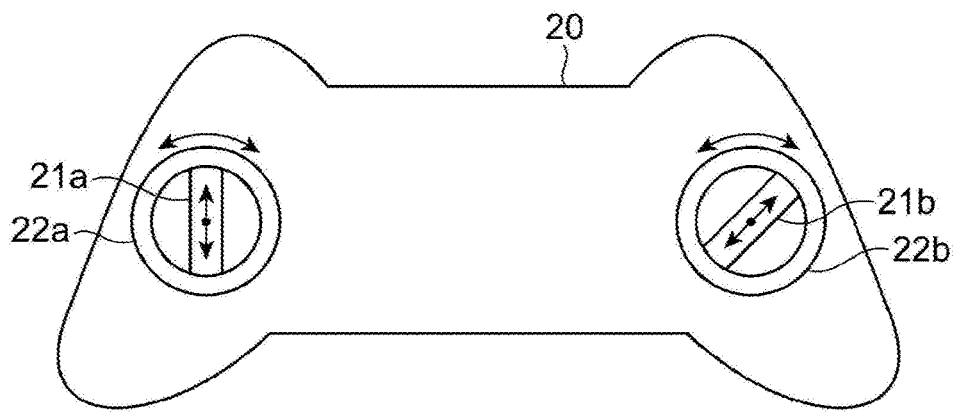
FIG. 6 is a diagram illustrating an example of a vibration device in which vibration mechanisms connected to drive mechanisms are disposed.

FIG. 6 is a schematic diagram illustrating a concrete example of such a vibration device 20. In the example of FIG. 6, two vibration mechanisms 21a and 21b are accommodated in the housing of the vibration device 20, and respectively connected to drive mechanisms 22a or 22b. The drive mechanisms 22 each vary the orientation of a connected vibration mechanism 21 in the housing by using, for example, a servomotor or a magnetic drive. The vibration control apparatus 10 is able to present the pseudo force sensation in various directions by operating the drive mechanisms 22 to vary the orientation of the vibration mechanisms 21 in an appropriate manner. The drive mechanisms 22 may be able to turn the vibration mechanisms 21 within a limited angular range in the same plane or turn the vibration mechanisms 21 in any 360-degree direction. Further, the drive mechanisms 22 may be able to vary the orientation of the vibration mechanisms 21 over a wide range not only in the same plane but also in the elevation angle and in the depression angle.

Furthermore, in a case where the vibration device 20 includes two vibration mechanisms 21 disposed at a distance from each other as illustrated in FIG. 6, the user can be made to feel as if a force is applied to turn the vibration device 20 when the vibration mechanisms 21 generate pseudo force sensations oriented in directions opposite to each other. For example, referring to FIG. 6, when the vibration mechanism 21a generates a pseudo force sensation oriented in the upward direction as viewed in FIG. 6, and the vibration mechanism 21b generates a pseudo force sensation oriented in the downward direction as viewed in FIG. 6, the user can be made to feel as if a force is applied to turn the vibration device 20 in a clockwise direction.

Figure 7:
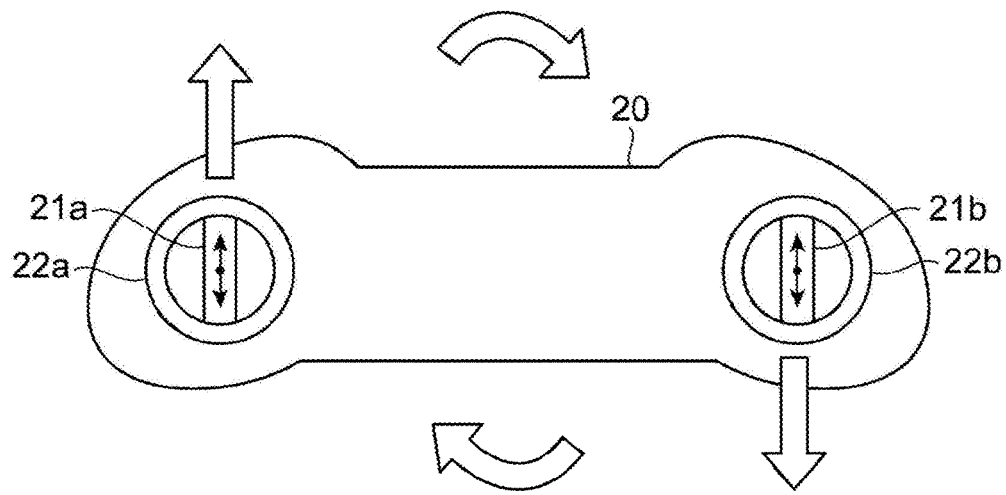
FIG. 7 is a diagram illustrating an example of turning control provided by the vibration device depicted in FIG. 6.

Moreover, when the drive mechanisms 22 are controlled to vary the orientation of the vibration mechanisms 21, the user can be made to feel as if a force is generated to turn the vibration device 20 in various directions. As an example, FIG. 7 depicts a rear view of the vibration device 20 illustrated in FIG. 6 when it is turned 90 degrees. Further, in the example of FIG. 7, the orientations of the vibration mechanisms 21a and 21b are varied by the drive mechanisms 22 so as to respectively generate a vibration along the vertical direction (the up-down direction in FIG. 7). When, in this state, as indicated by block arrows in FIG. 7, the vibration mechanism 21a generates a downward pseudo force sensation and the vibration mechanism 21b generates an upward pseudo force sensation, the user can be made to feel as if a force is applied to turn the vibration device 20 in the counterclockwise direction in the vertical plane.

The vibration control system 1 according to the present embodiment, which has been described above, is able to define the pseudo force sensation in accordance with the content information and thus present to the user the pseudo force sensation based on the content even if the pseudo force sensation to be generated is not predefined.

The present invention is not limited to the above-described embodiment. For example, the foregoing description assumes that the vibration device 20 is an operating device for receiving a user's operation input. However, the vibration device 20 is not limited to such an operating device. Alternatively, the vibration device 20 may be a device that is merely used to present a tactile sensation or a pseudo force sensation to the user or used for other purposes.

Further, the foregoing description assumes that the vibration control apparatus 10, which is separate from the vibration device 20, defines the pseudo force sensory vibration to be generated. However, the present invention is not limited to such a configuration. An alternative is to allow the vibration device 20 to define the pseudo force sensation to be presented based on the content information received from the vibration control apparatus 10. In this case, the vibration device 20 functions as the vibration control apparatus according to the embodiment of the present invention.

REFERENCE SIGNS LIST

1 Vibration control system, 10 Vibration control apparatus, 11 Control section, 12 Storage section, 13 Communication section, 14 Display apparatus, 15 Audio reproduction apparatus, 20 Vibration device, 21 Vibration mechanism, 22 Drive mechanism, 31 Content reproduction section, 32 Content information acquisition section, 33 Pseudo force sensation determination section, 34 Vibration control section.

The invention claimed is:

1. A vibration control apparatus for vibrating a vibration mechanism, the vibration control apparatus comprising:
a content information acquisition section that acquires content information about content including at least either one of video and audio to be presented to a user; and
a vibration control section that vibrates the vibration mechanism during the presentation of the content in such a manner as to present to the user a pseudo force sensation causing the user to feel a pulling force applied in a direction determined based on the content information, wherein:
the content includes audio on a plurality of channels, including a left stereo channel and a right stereo channel,
the content information includes information indicative of a left stereo channel volume and a right stereo channel volume, and
the vibration control section defines the pseudo force sensation such that the user feels the pulling force in a direction corresponding to a difference between the left stereo channel volume and the right stereo channel volume.

2. The vibration control apparatus according to claim 1, wherein
the content information includes frequency information of the audio, and the vibration control section further defines the pseudo force sensation in accordance with the frequency information.

3. The vibration control apparatus according to claim 2, wherein
the content information includes at least either one of a position and a direction of a sound source that are identified from the audio on each of the plurality of channels, and
the vibration control section defines the pseudo force sensation in accordance with either one of the position and direction of the sound source.

4. The vibration control apparatus according to claim 1, wherein the content information includes information about a position of a target object appearing in video to be presented to the user, and the vibration control section defines the pseudo force sensation in accordance with the position of the target object.

5. The vibration control apparatus according to claim 4, wherein the vibration control section determines the direction of the pseudo force sensation in accordance with the direction of movement of the target object.

6. The vibration control apparatus according to claim 1, wherein when a direction of pseudo force sensation defined based on the content information does not coincide with the direction of pseudo force sensation presentable by the vibration mechanism, the vibration control section causes the vibration mechanism to generate a given vibration instead of or in addition to the pseudo force sensation.

7. The vibration control apparatus according to claim 1, wherein the vibration mechanism is connected to a drive mechanism that varies the orientation of the vibration mechanism in a housing accommodating the vibration mechanism, and the vibration control section varies the vibration direction of the vibration mechanism by controlling the drive mechanism in accordance with the direction of pseudo force sensation defined based on the content information.

8. A method of controlling a vibration mechanism, the method comprising:

acquiring content information about content including at least either one of video and audio to be presented to a user, wherein the content is produced in response to an interactive gameplay application responding to user-input control data; and vibrating the vibration mechanism during the presentation of the content in such a manner as to present to the user a pseudo force sensation causing the user to feel a pulling force applied in a direction determined based on the content information, wherein:

the content includes audio on a plurality of channels, including a left stereo channel and a right stereo channel, the content information includes information indicative of a left stereo channel volume and a right stereo channel volume, and the vibrating includes defining the pseudo force sensation such that the user feels the pulling force in a direction corresponding to a difference between the left stereo channel volume and the right stereo channel volume.

9. A non-transitory, computer readable storage medium containing a computer program, which when executed by a computer, causes the computer to control a vibration mechanism, by carrying out actions, comprising:

acquiring content information about content including at least either one of video and audio to be presented to a user, wherein the content is produced in response to an interactive gameplay application responding to user-input control data; and vibrating the vibration mechanism during the presentation of the content in such a manner as to present to the user a pseudo force sensation causing the user to feel a pulling force applied in a direction determined based on the content information, wherein:

the content includes audio on a plurality of channels, including a left stereo channel and a right stereo channel, the content information includes information indicative of a left stereo channel volume and a right stereo channel volume, and the vibrating includes defining the pseudo force sensation such that the user feels the pulling force in a direction corresponding to a difference between the left stereo channel volume and the right stereo channel volume.

\* \* \* \* \*